US009472992B2

(12) United States Patent
Shaffer

(10) Patent No.: US 9,472,992 B2
(45) Date of Patent: Oct. 18, 2016

(54) ELECTRIC MOTOR SUPPORT STRUCTURE AND POWER EQUIPMENT UNIT INCORPORATING SAME

(71) Applicant: The Toro Company, Bloomington, MN (US)

(72) Inventor: Chadwick A. Shaffer, Oakdale, MN (US)

(73) Assignee: The Toro Company, Bloomington, MN (US)

( * ) Notice: Subject to any disclaimer, the term of this patent is extended or adjusted under 35 U.S.C. 154(b) by 383 days.

(21) Appl. No.: 13/939,708

(22) Filed: Jul. 11, 2013

(65) Prior Publication Data
US 2015/0013172 A1   Jan. 15, 2015

(51) Int. Cl.
*H02K 5/08* (2006.01)
*A01D 34/416* (2006.01)
*H02K 7/14* (2006.01)
*A01D 34/90* (2006.01)
*H02K 5/10* (2006.01)

(52) U.S. Cl.
CPC .............. *H02K 5/08* (2013.01); *A01D 34/416* (2013.01); *A01D 34/90* (2013.01); *H02K 7/145* (2013.01); *H02K 5/10* (2013.01)

(58) Field of Classification Search
CPC ................................ H02K 5/08; A01D 34/416
USPC ................................. 30/276; 56/12.7, 17; 310/50
See application file for complete search history.

(56) References Cited

U.S. PATENT DOCUMENTS

| 3,584,250 | A | * | 6/1971 | Bottani | G03B 21/43 310/105 |
| 3,831,278 | A | * | 8/1974 | Voglesonger | A01D 34/4166 30/276 |
| 3,959,879 | A | * | 6/1976 | Sellers | A01D 34/84 30/276 |
| 4,052,789 | A | * | 10/1977 | Ballas, Sr. | A01D 34/416 30/276 |
| 4,089,114 | A | * | 5/1978 | Doolittle | A01D 34/416 30/276 |
| 4,091,536 | A | * | 5/1978 | Bartholomew | A01D 34/4161 30/276 |
| 4,114,269 | A | * | 9/1978 | Ballas, Sr. | A01G 3/06 30/276 |
| 4,124,938 | A | * | 11/1978 | Ballas, Sr. | A01G 3/06 30/276 |
| 4,136,446 | A | * | 1/1979 | Tripp | A01D 34/4161 30/276 |
| 4,156,312 | A | * | 5/1979 | Ballas, Sr. | A01D 34/416 30/276 |
| 4,295,240 | A | * | 10/1981 | Lex | A47L 1/05 15/97.1 |
| 4,384,224 | A | * | 5/1983 | Spitler | H02K 1/185 310/415 |

(Continued)

Primary Examiner — Jason Daniel Prone
(74) Attorney, Agent, or Firm — Mueting, Raasch & Gebhardt, P.A.

(57) ABSTRACT

An outdoor power equipment unit such as a string trimmer, and an electric motor support structure for use with the same. The structure may form a cage that surrounds the motor and secures the motor in place relative to an outermost shell of a motor housing of the string trimmer. The cage may electrically and/or thermally insulate the outermost shell from the motor.

20 Claims, 4 Drawing Sheets

(56) References Cited

U.S. PATENT DOCUMENTS

| | | | |
|---|---|---|---|
| 4,435,877 A | 3/1984 | Berfield | |
| 4,578,863 A * | 4/1986 | Laverick | A01D 34/416 30/276 |
| 4,603,478 A * | 8/1986 | Anderson | A01D 34/416 30/276 |
| 4,690,366 A * | 9/1987 | Loup | H02K 5/225 310/89 |
| 4,786,299 A | 11/1988 | DeMarco | |
| 4,938,309 A | 7/1990 | Emdy | |
| 4,942,664 A * | 7/1990 | Zatulovsky | A01D 34/4163 30/276 |
| 5,230,612 A * | 7/1993 | Murphy | F16M 1/00 248/638 |
| 5,293,664 A | 3/1994 | Lim et al. | |
| 5,375,666 A * | 12/1994 | Pettet | A01D 34/905 30/276 |
| 5,407,330 A | 4/1995 | Rimington et al. | |
| 5,446,964 A * | 9/1995 | Woods | A01D 34/416 30/276 |
| 5,544,417 A * | 8/1996 | Atos | A01D 34/4165 30/276 |
| 5,567,127 A | 10/1996 | Wentz | |
| 5,679,989 A * | 10/1997 | Buscher | H02K 26/00 310/181 |
| 5,771,670 A * | 6/1998 | Perry | A01D 34/001 30/276 |
| 5,839,451 A * | 11/1998 | Dorber | A45D 20/50 132/271 |
| 5,881,464 A * | 3/1999 | Collins | A01D 34/4163 30/276 |
| 5,944,494 A | 8/1999 | Soltani et al. | |
| 5,987,756 A * | 11/1999 | Yates | A01D 34/416 30/276 |
| 6,014,812 A * | 1/2000 | Webster | A01D 34/4163 30/276 |
| 6,076,265 A * | 6/2000 | Huang Lo | A01D 34/76 30/265 |
| 6,216,691 B1 | 4/2001 | Kenyon et al. | |
| 6,454,640 B1 * | 9/2002 | Siedler | B24B 23/02 451/357 |
| 6,474,981 B1 * | 11/2002 | Morgan | F23D 11/001 417/371 |
| 6,588,109 B2 * | 7/2003 | Wilson | A01D 34/416 30/276 |
| 6,745,475 B1 * | 6/2004 | Trumpf | A01D 34/902 30/276 |
| 6,753,628 B1 * | 6/2004 | Neal | G11B 19/2009 310/43 |
| 6,843,644 B2 | 1/2005 | Rew et al. | |
| 7,078,835 B2 * | 7/2006 | Gross | F04D 29/626 310/89 |
| 7,111,403 B2 * | 9/2006 | Moore | A01D 34/4166 30/276 |
| 7,134,208 B2 * | 11/2006 | Wilkinson | A01D 34/902 30/276 |
| 7,651,325 B1 * | 1/2010 | Esch | A47L 5/22 310/239 |
| 7,770,660 B2 * | 8/2010 | Schroeder | B25F 5/02 173/1 |
| 7,886,509 B2 * | 2/2011 | Itoh | A01D 34/90 30/276 |
| 8,136,333 B1 * | 3/2012 | Levin | A01D 34/685 30/276 |
| 2003/0037933 A1 * | 2/2003 | Breneman | A01D 34/84 30/276 |
| 2004/0128838 A1 * | 7/2004 | Hurst | A01D 34/4162 30/276 |
| 2004/0128839 A1 * | 7/2004 | Shaffer | A01D 34/902 30/276 |
| 2006/0123635 A1 * | 6/2006 | Hurley | A01D 34/4163 30/276 |
| 2010/0064542 A1 * | 3/2010 | Mulvaney | A45D 20/12 34/97 |
| 2010/0126023 A1 * | 5/2010 | Griffin | A01D 42/06 30/276 |
| 2010/0170538 A1 * | 7/2010 | Baker | B08B 15/04 30/124 |
| 2010/0218386 A1 * | 9/2010 | Roβkamp et al. | A01G 3/053 30/277.4 |
| 2010/0313429 A1 * | 12/2010 | Yamaoka | A01D 34/90 30/276 |
| 2011/0010958 A1 * | 1/2011 | Clark | A45D 20/10 34/97 |
| 2012/0167879 A1 | 7/2012 | Bowman et al. | |
| 2014/0190017 A1 * | 7/2014 | Maynez | A01D 34/416 30/276 |

* cited by examiner

ELECTRIC MOTOR SUPPORT STRUCTURE AND POWER EQUIPMENT UNIT INCORPORATING SAME

Embodiments of the present invention relate generally to outdoor power equipment, and, more particularly, to structures, systems, and methods for mounting and supporting an outdoor power equipment electric motor within a motor housing.

BACKGROUND

Outdoor power equipment such as filament (also known as "line" or "string") trimmers are commonly used by homeowners and professionals alike. These devices generally include a filament or string having end(s) that extend radially outward from a rotatable spool or head. The head is generally part of a housing attached to one end of an elongate shaft, while the opposite end of the shaft forms one or more handles and controls for grasping/manipulation by an operator. When the head is selectively powered, it may rotate at a velocity that permits the rapidly spinning string to cut vegetation that may not otherwise be accessible with conventional lawn mowers.

While gasoline-powered string trimmers are popular, electrically-powered string trimmers are often preferred by homeowners as, for example, they are made of lighter materials such as plastic and are less expensive than their gasoline-powered counterparts. Moreover, electric string trimmers may produce less noise/emissions and require less maintenance than gasoline-powered devices. While alternating current (AC)-powered plug-in trimmers are well known, direct current (DC), battery-powered electric trimmers have become popular due to their ability to operate without a conventional electrical extension cord.

While effective, battery-powered string trimmers are sometimes perceived as performance-limited as compared to their gasoline-powered and plug-in counterparts. These perceived limitations are generally attributable to the capacity and power constraints of the battery itself.

However, in recent years, lithium-ion battery technology has permitted more powerful string trimmers to enter the market. Limitations may exist, however, in accommodating and supporting heavier and higher performing batteries and motors in the lightweight, plastic housings typically associated with electric string trimmers.

SUMMARY

The present invention may overcome these and other issues with electric string trimmers by providing, in one embodiment, a motor housing for an electric outdoor power equipment unit. The housing may include: a metallic outermost shell; and an electric motor surrounded by the outermost shell, the electric motor including an output shaft that protrudes outwardly through the outermost shell. A support cage including a rigid material may also be provided. The support cage may be contained within the outermost shell within an annular region between the outermost shell and the electric motor, wherein the support cage is adapted to support the electric motor in spaced-apart relation to the outermost shell and electrically insulate the motor from the outermost shell.

In another embodiment, a battery-powered string trimmer is provided that includes: an elongate shaft having a first end and a second end; a handle located at the first end of the elongate shaft; and a motor housing secured to the second end of the elongate shaft. The motor housing may include: an electric motor having an output shaft; a metallic outermost shell surrounding the electric motor, wherein the output shaft protrudes outwardly through the outermost shell; a cutting head attached to the output shaft such that the cutting head is located outside of the outermost shell; and a support cage comprising a plastic material. The support cage is located in an annular region between the outermost shell and the electric motor, wherein the support cage is adapted to support the electric motor in spaced-apart relation to the outermost shell and electrically insulate the motor from the outermost shell.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein.

Figure 1:
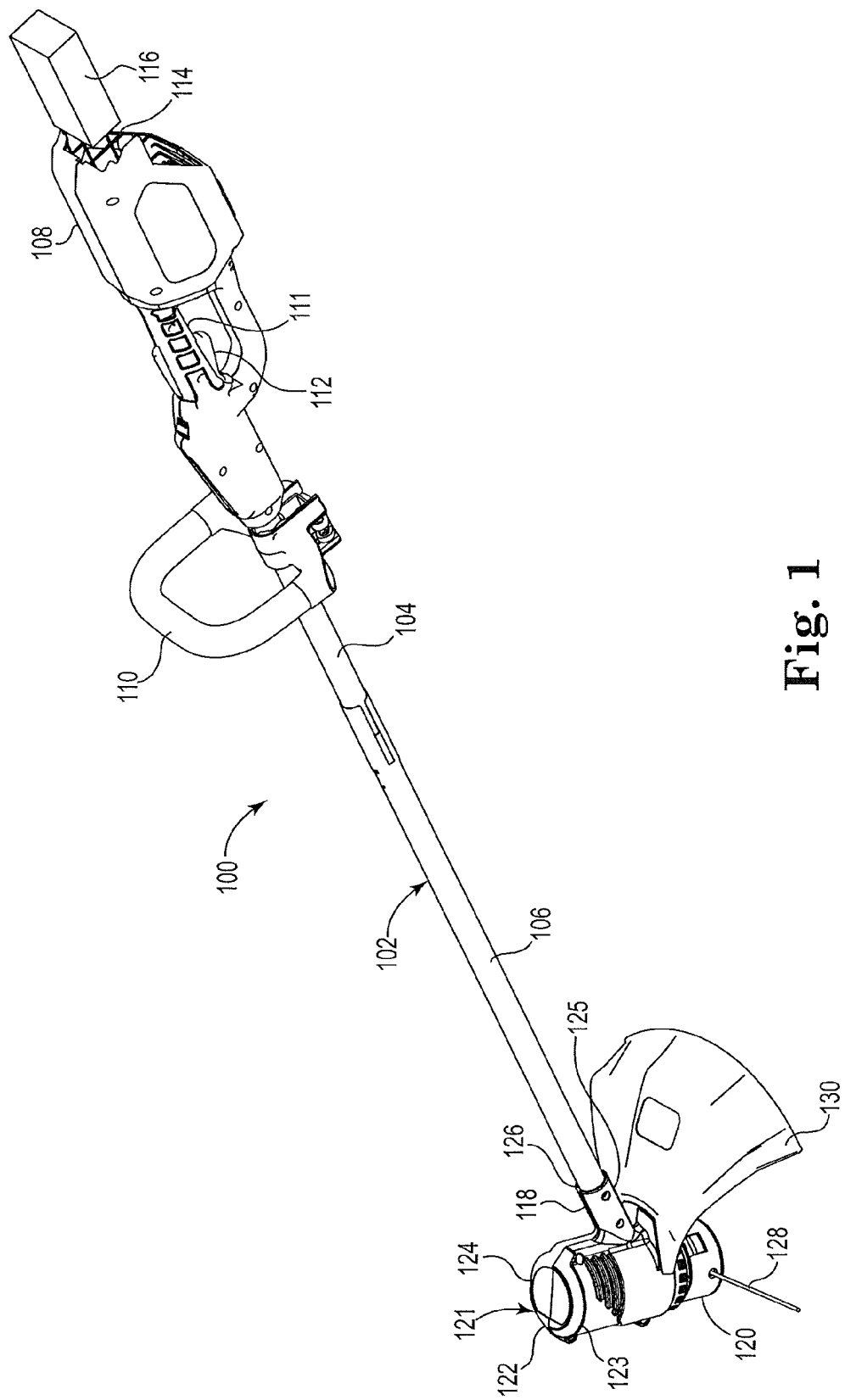
FIG. 1 illustrates an electric power equipment unit, e.g., battery-powered string trimmer, in accordance with one embodiment of the invention.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments of the invention. The lack of illustration/description of such structure/components in a particular figure is, however, not to be interpreted as limiting the scope of the invention in any way.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Embodiments of the instant invention are directed to a rugged, electric motor support structure and an outdoor power equipment unit, such as a battery-powered string trimmer, incorporating the same. The support structure may define inner surfaces that form a receptacle adapted to snugly receive an electric motor, while outer surfaces of the support structure may be configured to be received snugly against inner surfaces of an outermost shell of a motor housing. In the illustrated embodiment, this nesting configuration permits the support structure to support the motor in spaced-apart relation to the shell. Moreover, the support structure may be configured to insulate the motor electrically and/or thermally from the outermost shell, thereby reducing or preventing potential electrical shorting to, and/or excessive heating of, the shell.

While shown and described herein in the context of a motor housing for an electric string trimmer, those of skill in the art will realize that embodiments of the present invention may find application to motor housings for other outdoor power equipment units (e.g., debris blower/vacuums, hedge trimmers, and the like) without departing from the scope of the invention.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective observed in the particular figure, or as observed when the power equipment unit is in its typical operating orientation (see, e.g., FIG. 1). These terms are used only to simplify the description, however, and not to limit the scope of the invention in any way.

With reference to the drawings, wherein like reference numerals designate like parts and assemblies throughout the several views, FIG. 1 illustrates a power equipment unit, e.g., battery-powered string trimmer 100, in accordance with one embodiment of the invention. The trimmer 100 may include an elongate shaft 102, which in the illustrated embodiment, includes an upper shaft 104 and a lower shaft 106 joined with a connector (not illustrated). A first or upper end of the string trimmer e.g., a handle end 108, may form a handle configured to receive hands of an operator to permit control of the trimmer. For example, the handle end 108 may include one or more handles (e.g., grip handle 111 and support handle 110) as shown. Controls, e.g., a trigger switch 112, may also be provided to selectively energize (e.g., power) an electric motor (described in more detail below). Other controls or indicators may also be included on the handle end 108.

The handle end 108 (e.g., the handle 111) may further include a recess or receptacle 114 configured to receive a battery 116 (shown diagrammatically and exploded from the trimmer in FIG. 1) adapted to power the trimmer. While not wishing to be bound to any particular embodiment, the battery 116 may, in one embodiment, include a plurality of lithium-ion cells collectively having a maximum output voltage of about 24 volts (V) DC or more, e.g., 48V. This is not limiting, however, as higher and lower voltages, as well as other battery chemistries, are certainly possible without departing from the scope of the invention.

Attached to a second or lower end of the string trimmer, e.g., to a tool end 118, is a motor housing 121 to which is attached a string trimmer cutting head 120. The housing may be defined, at least in part, by an external or outermost shell 122. As further described below, the cutting head 120 may be powered by a DC electric motor 200 enclosed within or otherwise surrounded by the outermost shell 122 (see FIG. 3).

In the illustrated embodiment, the shell 122 is constructed of two mating halves 123, 124 of metallic, e.g., aluminum, material. The halves 123, 124 may be generally semi-cylindrical in shape and include receivers 125, 126 to permit rigid attachment of the shell 122 to the end of the lower shaft 106, e.g., with fasteners (not shown).

Figure 2:
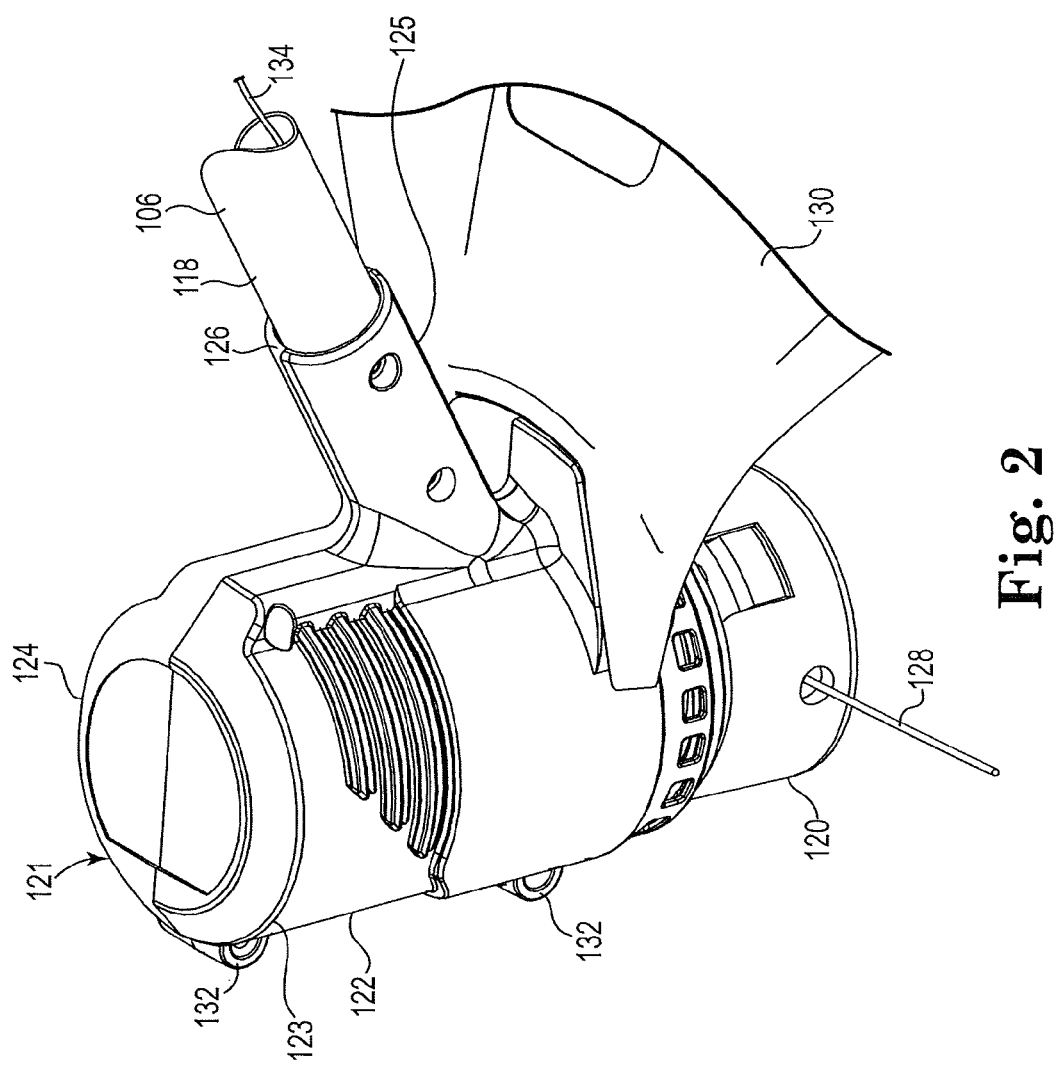
FIG. 2 is a partial enlarged partial view of a tool end of the string trimmer of FIG. 1 illustrating a motor housing in accordance with one embodiment of the invention.

FIG. 2 is an enlarged view of the motor housing 121. As shown in this view, the cutting head 120 may be attached to a driven or output shaft 222 (see FIG. 3) of the motor 200, the output shaft protruding outwardly through and beyond the outermost shell 122. As a result, the cutting head 120 may be located outside of the outermost shell 122, e.g., beneath, the housing 121. During operation, the motor 200 may rotate the cutting head 120. As the head rotates, one or more flail lines 128 may correspondingly rotate at a speed sufficient to cut vegetation. To reduce the chances of ejecting cut debris towards the operator, the housing 121 may further include a guard 130 (only partially illustrated in FIG. 2, but see FIG. 1).

Figure 4:
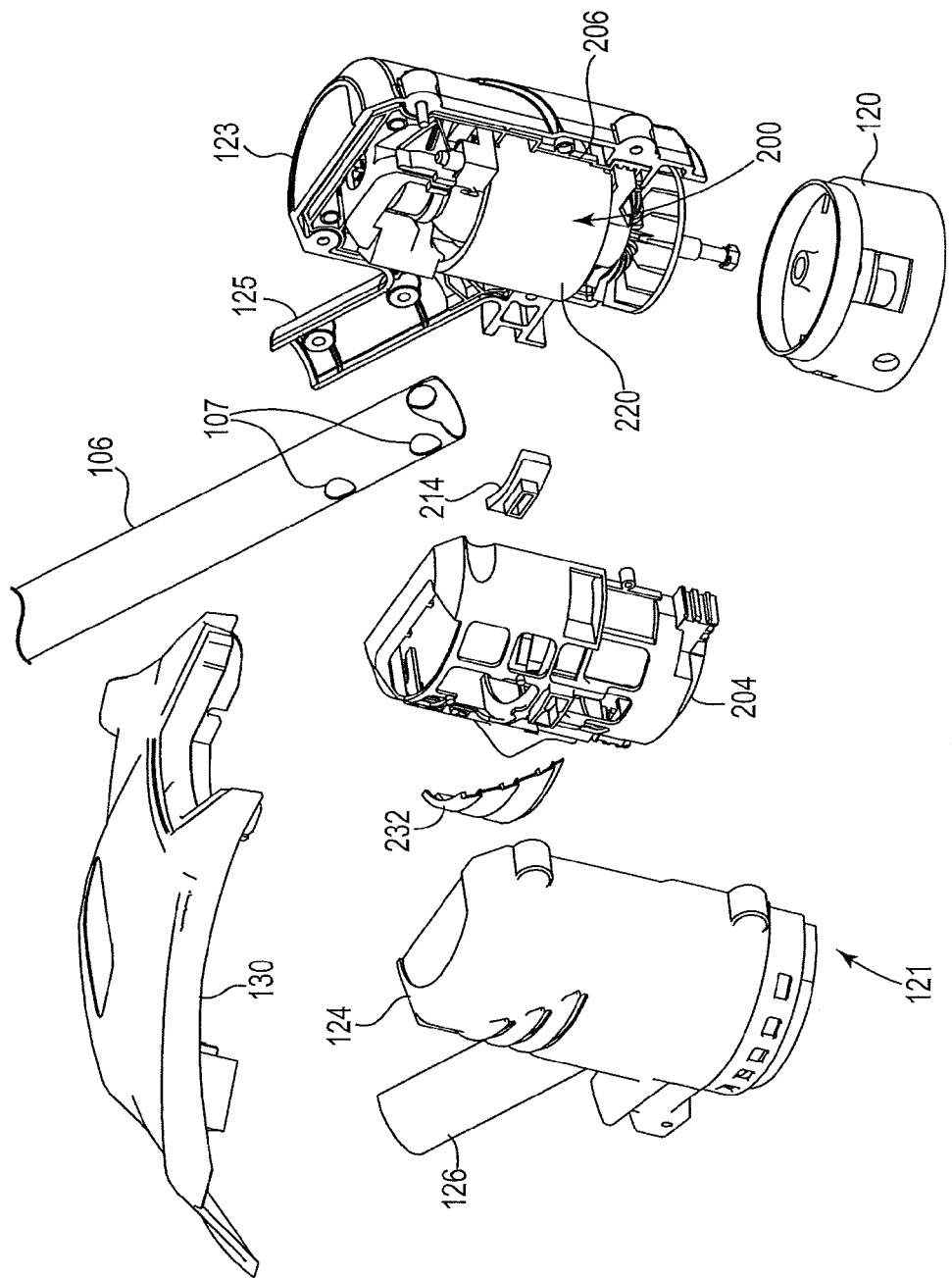
FIG. 4 is a partially assembled view of the motor housing of FIG. 2.

The halves 123, 124 of the outermost shell 122 may be secured to one another using fasteners (not shown) passing through lugs 132, as well as fasteners passing through the holes in the receivers 125, 126 (these fasteners may also pass through holes formed in the lower shaft 106 as indicated in FIG. 4).

As further shown in FIG. 2, a wire 134 or other conductive member may be routed through the shaft 102 from the handle end 108 to the electric motor 200. The wire may operatively connect the power source (e.g., battery 116), via the trigger switch 112, to the electric motor 200 to power the latter.

Figure 3:
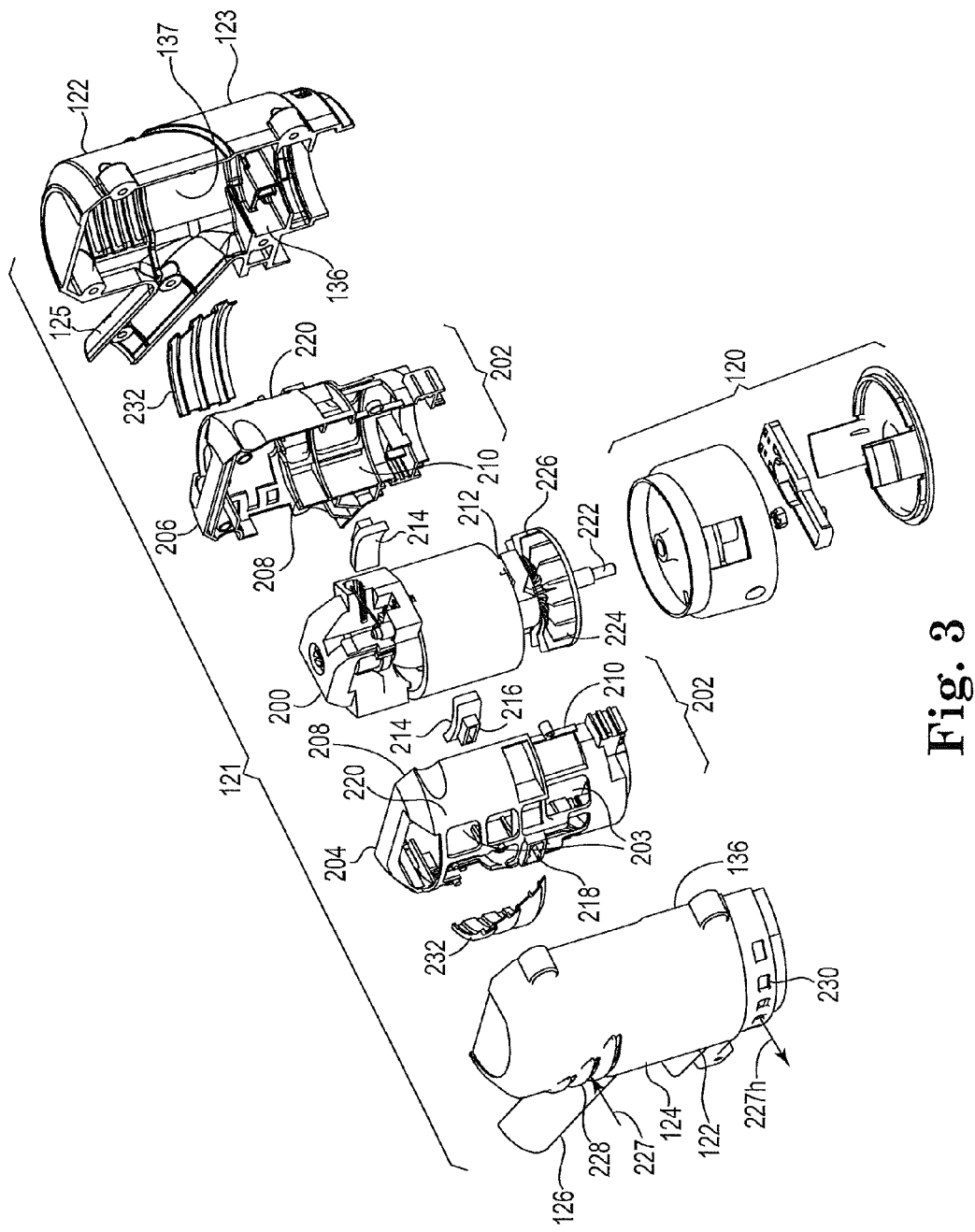
FIG. 3 is an partial exploded view of the motor housing of FIG. 2.

FIG. 3 is an exploded view of the motor housing 121 in accordance with one embodiment of the invention. As shown in this view, the housing may include not only cage 202. The cage 202 may be contained within the outermost shell, i.e., located within an annular region between the outermost shell 122 and the motor 200 when the housing 121 is assembled. The support cage 202 may, in the illustrated embodiment, be adapted to support the electric motor 200 in spaced-apart relation to the outermost shell 122.

In the illustrated embodiment, the support cage 202 is made of a rigid material such as plastic (e.g., a polyamide such as nylon or the like). Preferably, the cage is designed to provide one or both of electrical and thermal insulation between the electric motor 200 and the outermost shell 122 of the housing 121. In some embodiments, the support cage 202 may further include resilient pads 214. The pads 214 may be located relative to the support cage (e.g., tabs 216 may be received in slots 218) and may be compressed between the support cage and the motor when the motor housing is assembled. The resilient pads may provide some degree of vibration isolation to the motor.

The cage 202 may be configured as two mating (e.g., semi-cylindrical) halves 204 and 206 having inner surfaces 208 that together define a shaped interior space 210 when the two halves are assembled. The inner surfaces 208 are configured to receive the motor 200 in a nesting relationship.

In a manner similar to the motor and support cage, the outermost shell 122 (e.g., the shell halves 123, 124) may include inner surfaces 136 that, when the shell halves are assembled, define a shaped interior space 137. The inner surfaces 136 of the outermost shell 122 are configured to receive outer surfaces 220 of the support cage 202 in a nesting relationship. Accordingly, the outer surfaces 220 and inner surfaces 136 may be substantially similar in shape so that the support cage 202, and thus the motor 220, are securely held in place relative to the outermost shell when the motor housing is assembled.

As used herein, "nest" or "nesting relationship" means that outer surfaces of a first part (e.g., outer surfaces 220 of the cage 202) are received in abutting relation with corresponding inner surfaces of a second part (inner surfaces 136 of outermost shell 122) such that, when assembled, the first and second parts fit together like pieces of a puzzle. For instance, when the two halves 204, 206 of the cage 202 are brought into contact with the motor 200, the motor may fit snugly within the interior space 210 where it is securely held in place relative to the cage 202 by interaction between the inner surfaces 208 of the cage and the outer surfaces 212 of the motor (similar interaction occurs between the outer surfaces 220 of the cage and the inner surfaces 136 of the outermost shell 122). This nesting relationship ensures not only that proper orientation of the relative parts is maintained, but also that the parts are basically substantially immobilized relative to each other once assembly is complete.

As shown in FIG. 3, the motor 200 may include the output shaft 222 operable to drive the cutting head 120. An impeller 224 may be attached to the output shaft 222 such that it rotates with the shaft within the motor housing 121. The impeller 224 may include a plurality of vanes or blades 226 that draw cooling air 227 into the motor housing/outermost shell, e.g., via one or more vents 228, and exhaust heated air 227h outwardly through the housing, e.g., at one or more exhaust vents 230. The support cage 202 may form a structure having multiple openings or perforations 203 passing completely through the cage to allow air circulation through the cage, e.g., to allow cooling air 227 to flow into the support cage 202 and around the motor 200 to cool the latter. To reduce the entrance of debris into the motor housing 121, the vents 228 may utilize a foam or mesh filter element 232.

FIG. 4 illustrates a method of assembling the motor housing 121 in accordance with one embodiment of the invention. In general, the support cage half, e.g., half 206, may be placed into the cavity of one of the outermost shell halves, e.g., half 123 (before which the corresponding filter 232 and pad 214 are placed). The motor 200 may then be placed into the half 206 as shown and the wire 134 (see FIG. 2) routed. The half 204 (with pad 214 in place) may then be placed over the motor 200 until the two support cage halves 204, 206 are snugly received about the motor. The second shell half, e.g., half 124, and corresponding filter 232 may then be placed over the first shell half and attached thereto with fasteners (not shown). The lower shaft 106 may then be attached to the motor housing 121 via fasteners (not shown) passing through the receivers 125, 126 and openings 107 in the shaft 106.

Once assembled, the motor 200 may be securely held in place relative to the outermost shell 122. However, due to the non-conductive properties of the support cage, the outermost shell 122 may remain electrically insulated from the motor 200, and may stay cool to the touch due to the heat isolation properties of the support cage and the cooling air flow.

Illustrative embodiments of this invention are described and reference has been made to possible variations within the scope of this invention. These and other variations, combinations, and modifications of the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A string trimmer comprising:
   a battery;
   an elongate shaft having a first end and a second end;
   a handle located at the first end of the elongate shaft;
   a motor housing secured to the second end of the elongate shaft, the motor housing comprising:
      an electric motor having an output shaft, wherein the electric motor is connected to the battery such that the electric motor is powered by the battery;
      a metallic outermost shell surrounding the electric motor and comprising one or more vents, wherein the output shaft protrudes outwardly through the outermost shell;
      a cutting head attached to the output shaft such that the cutting head is located outside of the outermost shell;
      a support cage comprising a plastic material, the support cage located in an annular region between the outermost shell and the electric motor, wherein the support cage is adapted to support the electric motor in spaced-apart relation to the outermost shell and electrically insulate the motor from the outermost shell; and
      one or more filter elements to filter air passing through the one or more vents of the metallic outermost shell, wherein the one or more filter elements are disposed between the one or more vents of the metallic outermost shell and the support cage.

2. The trimmer of claim 1, further comprising resilient pads compressed between the support cage and the electric motor.

3. The trimmer of claim 1, wherein the handle comprises a trigger switch adapted to energize the electric motor.

4. The trimmer of claim 1, wherein the handle defines a receptacle adapted to receive the battery.

5. The trimmer of claim 1, wherein the battery provides a maximum output voltage of 24 volts DC or more.

6. The trimmer of claim 1, wherein the battery provides a maximum output voltage of 48 volts DC.

7. The trimmer of claim 1, wherein one or both of the outermost shell and the support cage comprise mating, semi-cylindrical halves.

8. The trimmer of claim 1, wherein the plastic material comprises a polyimide material.

9. The trimmer of claim 1, wherein the support cage is further adapted to thermally insulate the electric motor from the outermost shell.

10. The trimmer of claim 1, wherein the support cage further comprises a plurality of openings passing completely through the support cage, the plurality of openings adapted to permit air flow through the support cage.

11. The trimmer of claim 1, wherein the support cage comprises inner surfaces defining a shaped interior space, the inner surfaces adapted to receive the motor in a nesting relationship.

12. The trimmer of claim 1, wherein the outermost shell comprises inner surfaces that define the annular region and are adapted to receive the support cage in a nesting relationship.

13. A motor housing for an electric outdoor power equipment unit, the housing comprising:
   a metallic outermost shell comprising one or more vents;
   an electric motor surrounded by the outermost shell, the electric motor comprising an output shaft that protrudes outwardly through the outermost shell;
   a support cage comprising a rigid material, the support cage contained within the outermost shell within an annular region between the outermost shell and the electric motor, wherein the support cage is adapted to support the electric motor in spaced-apart relation to the outermost shell, and further wherein the support cage comprises a non-conductive material that electrically insulates the motor from the outermost shell; and one or more filter elements to filter air passing through the one or more vents of the metallic outermost shell, wherein the one or more filter elements are disposed between the one or more vents of the metallic outermost shell and the support cage.

14. The housing of claim 13, further comprising resilient pads compressed between the support cage and the electric motor.

15. The housing of claim 13, wherein one or both of the outermost shell and the support cage comprise mating, semi-cylindrical halves.

16. The housing of claim 13, wherein the support cage comprises a plastic material.

17. The housing of claim 13, wherein the support cage comprises a plurality of perforations adapted to allow air circulation through the cage.

18. The housing of claim 13, wherein the support cage is further adapted to thermally insulate the electric motor from the outermost shell.

19. The housing of claim 13, further comprising an impeller attached to the output shaft, the impeller adapted to draw the air into the outermost shell through the one or more vents and exhaust heated air outwardly through one or more exhaust vents.

20. The housing of claim 13, wherein the electric motor is a direct current (DC) electric motor.

\* \* \* \* \*